United States Patent
Arreola-Sandoval

(10) Patent No.: US 12,386,388 B2
(45) Date of Patent: Aug. 12, 2025

(54) PORTABLE PHONE CHARGING ASSEMBLY

(71) Applicant: Daniel Arreola-Sandoval, Fresno, CA (US)

(72) Inventor: Daniel Arreola-Sandoval, Fresno, CA (US)

( * ) Notice: Subject to any disclaimer, the term of this patent is extended or adjusted under 35 U.S.C. 154(b) by 621 days.

(21) Appl. No.: 17/867,781

(22) Filed: Jul. 19, 2022

(65) Prior Publication Data
US 2024/0028075 A1  Jan. 25, 2024

(51) Int. Cl.
| | |
|---|---|
| G06F 1/16 | (2006.01) |
| H02J 7/00 | (2006.01) |
| H02J 7/35 | (2006.01) |
| H02J 50/10 | (2016.01) |
| H04B 1/3877 | (2015.01) |

(52) U.S. Cl.
CPC .......... *G06F 1/1632* (2013.01); *H02J 7/0044* (2013.01); *H02J 7/35* (2013.01); *H02J 50/10* (2016.02); *H04B 1/3877* (2013.01)

(58) Field of Classification Search
CPC ......... G06F 1/1632; H02J 7/0044; H02J 7/35; H02J 50/10
USPC .......................................... 320/107, 108, 115
See application file for complete search history.

(56) References Cited

U.S. PATENT DOCUMENTS

| | | | | |
|---|---|---|---|---|
| 8,432,124 B2 * | 4/2013 | Foster | ................... | A45C 11/00 320/101 |
| D714,772 S | 10/2014 | Rozzo | | |
| 9,209,650 B2 | 12/2015 | Nita | | |
| 9,368,999 B2 * | 6/2016 | Watanabe | ............... | B60R 11/02 |
| 9,793,739 B2 * | 10/2017 | Koren | ..................... | H02J 50/40 |
| 10,623,039 B2 | 4/2020 | Altaras | | |
| 11,159,034 B2 * | 10/2021 | Kim | ........................ | G01R 33/07 |
| 11,689,068 B2 * | 6/2023 | Bober | .................. | H02J 7/0044 320/101 |
| 2005/0162121 A1 | 7/2005 | Chan | | |
| 2016/0173667 A1 | 6/2016 | Torres Gutierrez et al. | | |
| 2016/0261139 A1 * | 9/2016 | Kidakarn | ............. | H02J 7/0044 |
| 2017/0163077 A1 | 6/2017 | Lindner | | |
| 2019/0149088 A1 | 5/2019 | Chaturvedi | | |
| 2020/0091760 A1 | 3/2020 | Fillit | | |

FOREIGN PATENT DOCUMENTS

WO    WO2016109562    7/2016

* cited by examiner

*Primary Examiner* — Richard V Muralidar

(57) ABSTRACT

A portable phone charging assembly for charging a personal electronic device that includes a panel that has a planar surface for supporting a personal electronic device. A pair of fixed grips is each coupled to the panel and a movable grip is movably integrated into the panel to restrain a personal electronic device on the panel. A member is hingedly disposed on the panel and a coupler is attached to the member. An adhesive element is disposed on the member to releasably engage a support surface thereby inhibiting the panel from sliding. A charging unit is attached to the panel and the charging unit is in wireless communication with the personal electronic device when the personal electronic device is positioned on the panel for wirelessly charging the personal electronic device.

10 Claims, 9 Drawing Sheets

PORTABLE PHONE CHARGING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to charging device and more particularly pertains to a new charging device for portably charging a personal electronic device. The device includes a panel with a fixed grip and a pair of movable grips for securing a personal electronic device to the panel. A charging unit is attached to the panel which includes a plurality of solar cells, a rechargeable battery and a transmitter which is integrated into the panel.

(2) Description of Related Art Including Information Disclosed under 37 CFR 1.97 and 1.98

The prior art relates to charging devices including a solar powered charging device that includes a base with a plurality of charging recesses, a tower extending upwardly from the base and a platform disposed on the tower which has solar cells. The prior art discloses a portable charging device that includes a first panel hingedly coupled to a second panel and a plurality of solar cells each disposed on the first panel and the second panel. The prior art discloses a wireless charging device that includes a suction cup, an articulated arm extending away from the suction cup and a charging panel disposed on the charging cup which has wireless charging capabilities. The prior art discloses a cellular phone case which has a solar powered charger integrated into the cellular phone case. The prior art discloses an electrical outlet box that includes a solar panel for generating electricity for charging electronic devices. The prior art discloses a cellular phone docking station which includes a suction cup, a mount attached to the suction cup and a gripping panel pivotally disposed on the mount which can engage a smart phone.

BRIEF SUMMARY OF THE INVENTION

An embodiment of the disclosure meets the needs presented above by generally comprising a panel that has a planar surface for supporting a personal electronic device. A pair of fixed grips is each coupled to the panel and a movable grip is movably integrated into the panel to restrain a personal electronic device on the panel. A member is hingedly disposed on the panel and a coupler is attached to the member. An adhesive element is disposed on the member to releasably engage a support surface thereby inhibiting the panel from sliding. A charging unit is attached to the panel and the charging unit is in wireless communication with the personal electronic device when the personal electronic device is positioned on the panel for wirelessly charging the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
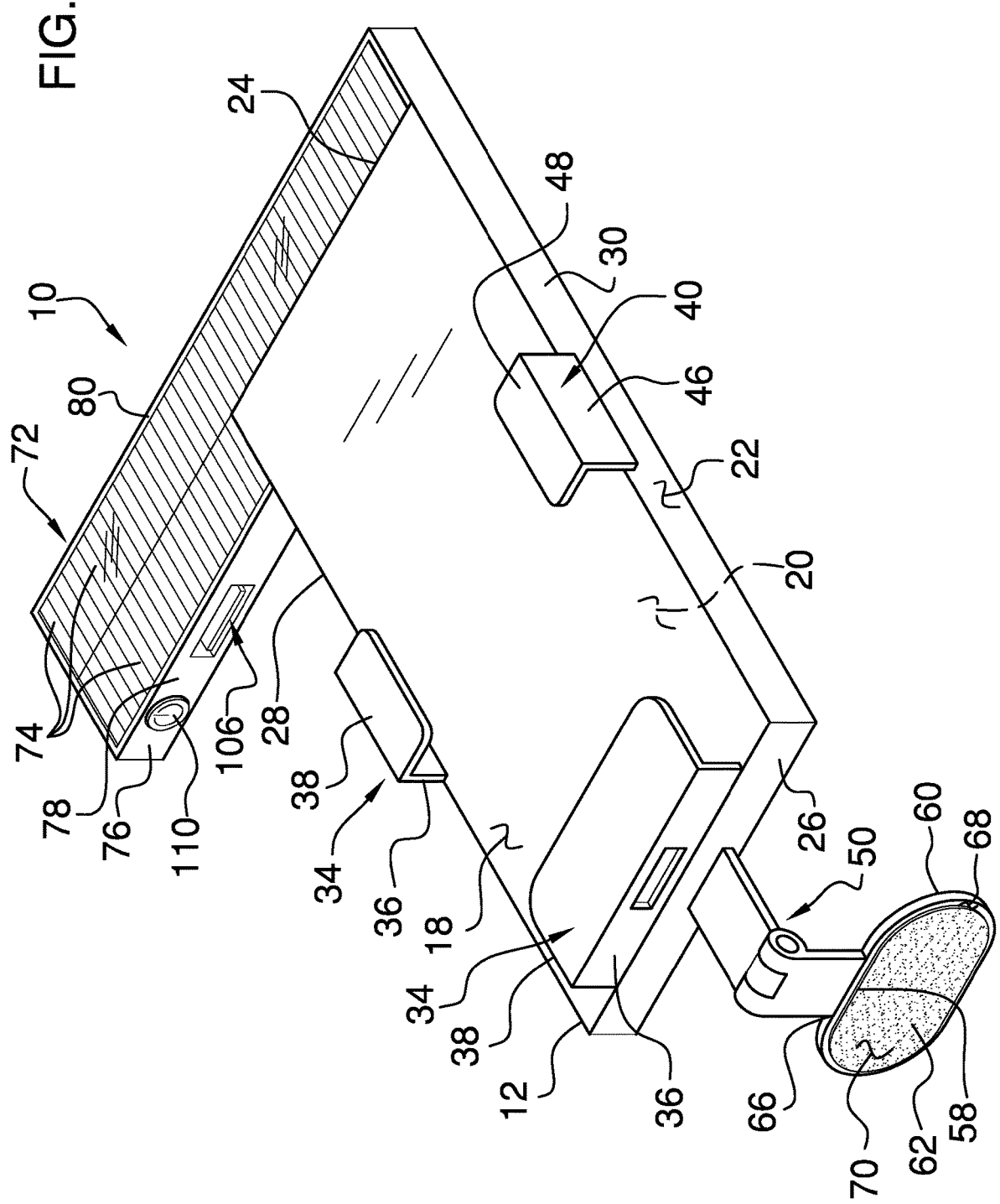
FIG. 1 is a top perspective view of a portable phone charging assembly according to an embodiment of the disclosure.
Figure 2:
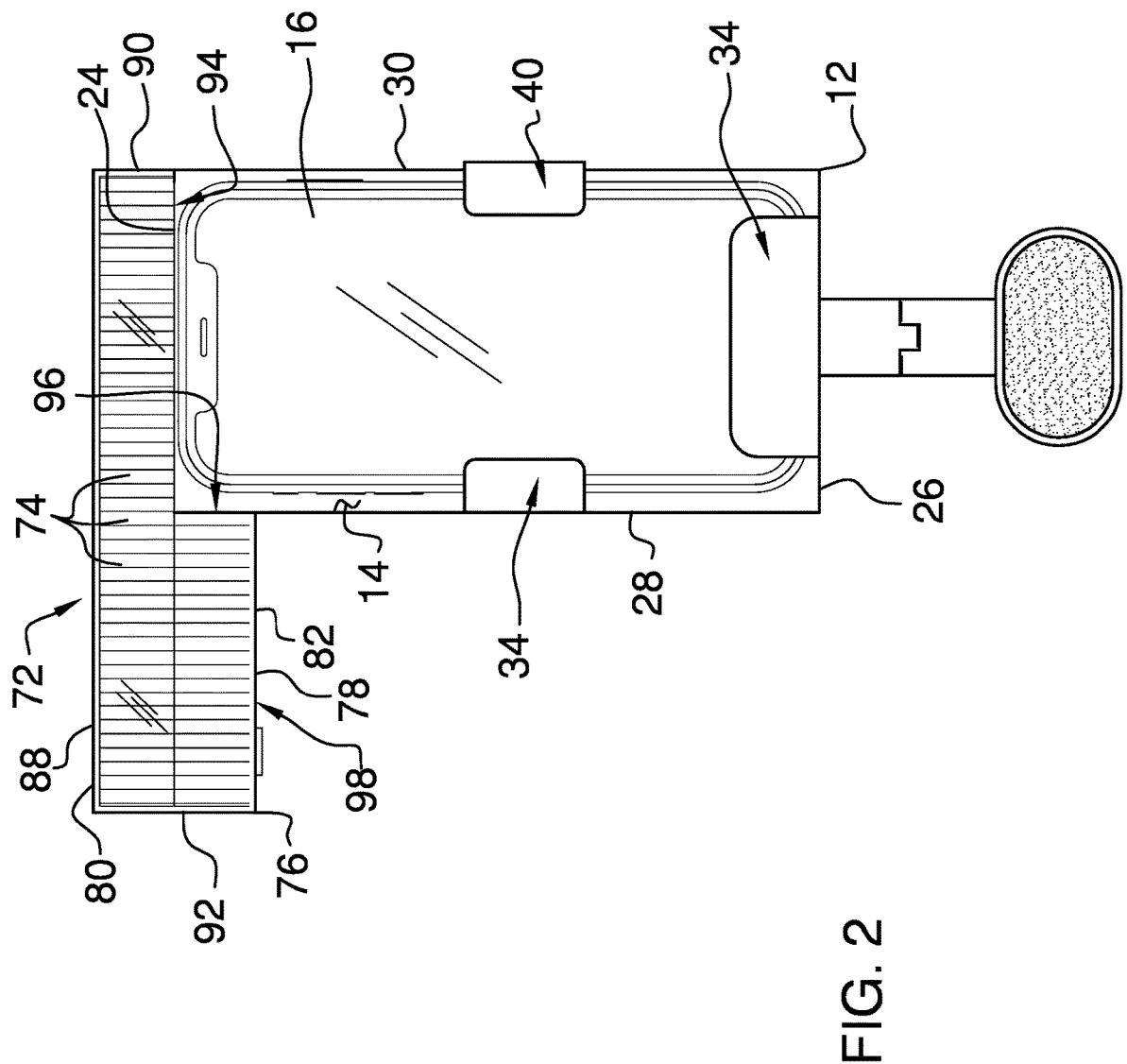
FIG. 2 is a top view of an embodiment of the disclosure.
Figure 3:
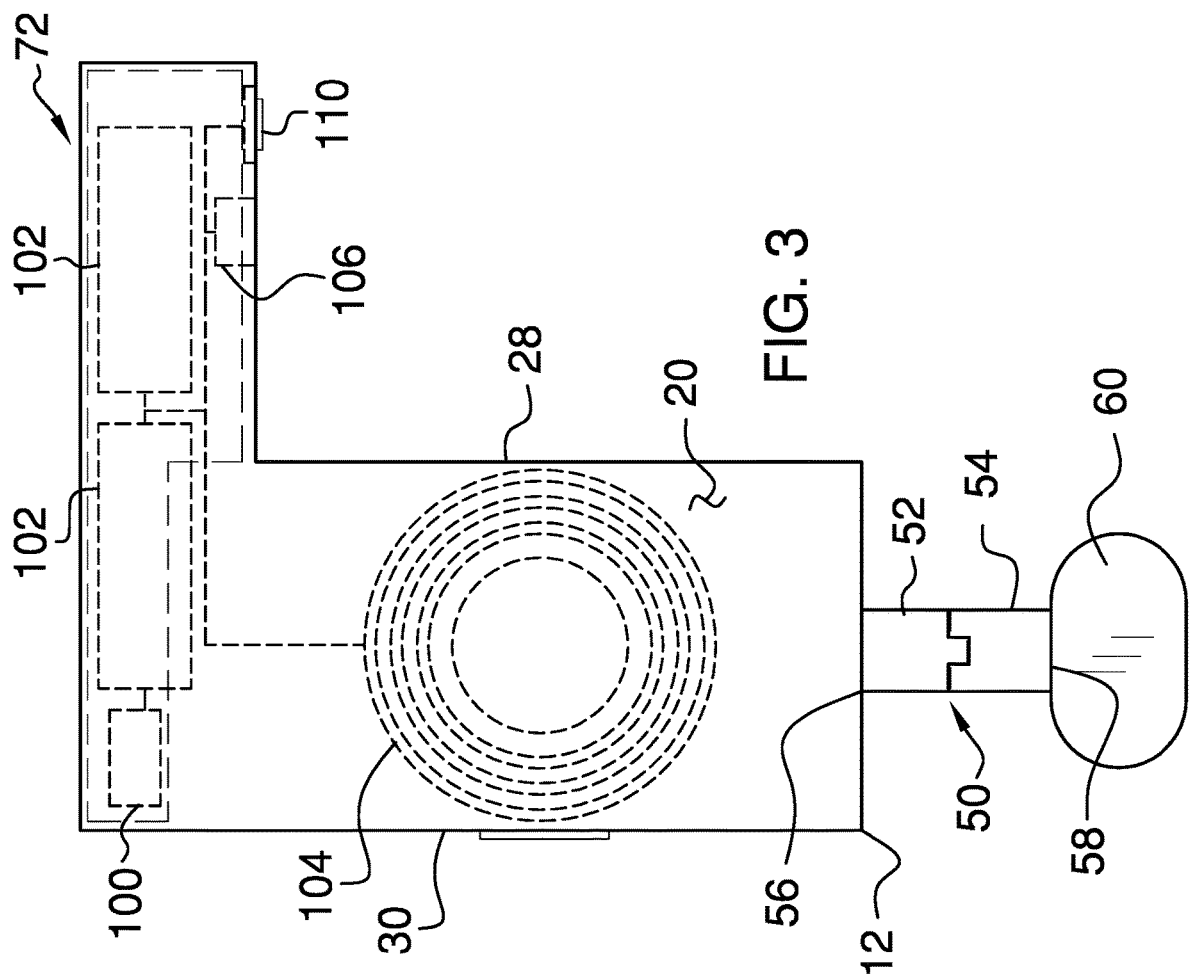
FIG. 3 is a bottom phantom view of an embodiment of the disclosure.
Figure 4:
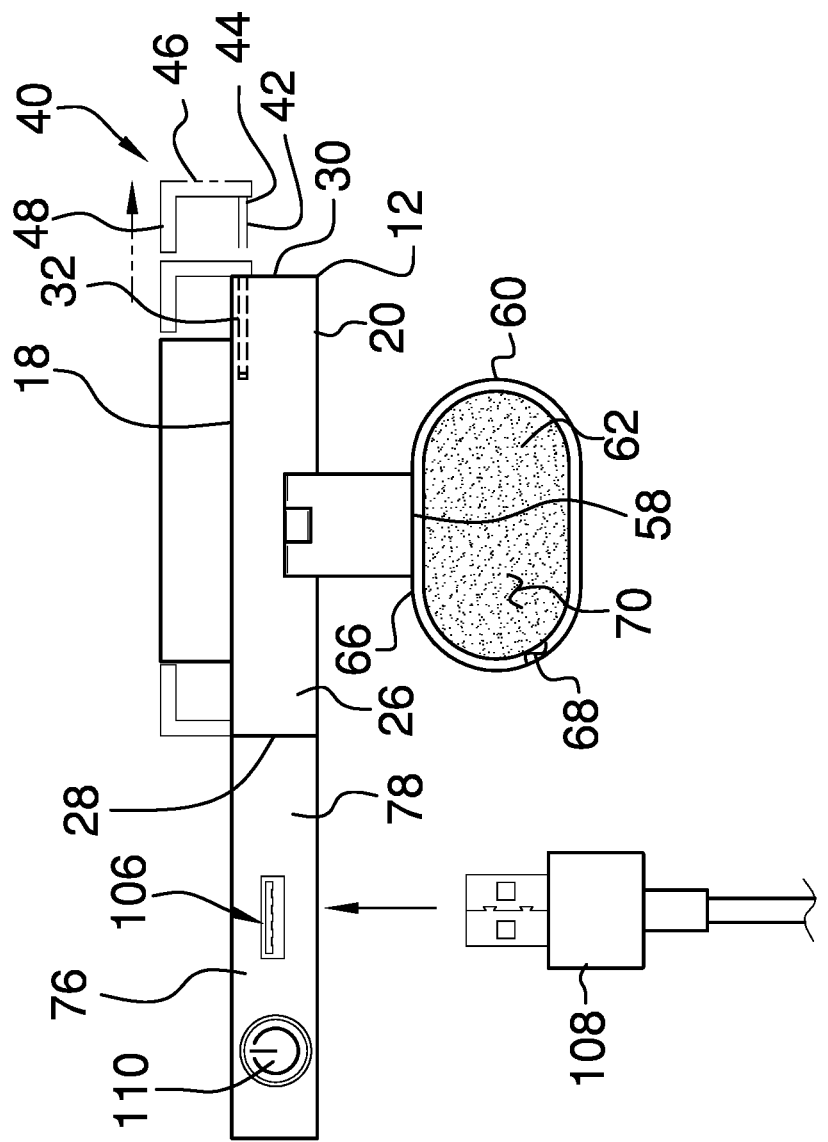
FIG. 4 is a front view of an embodiment of the disclosure.
Figure 5:
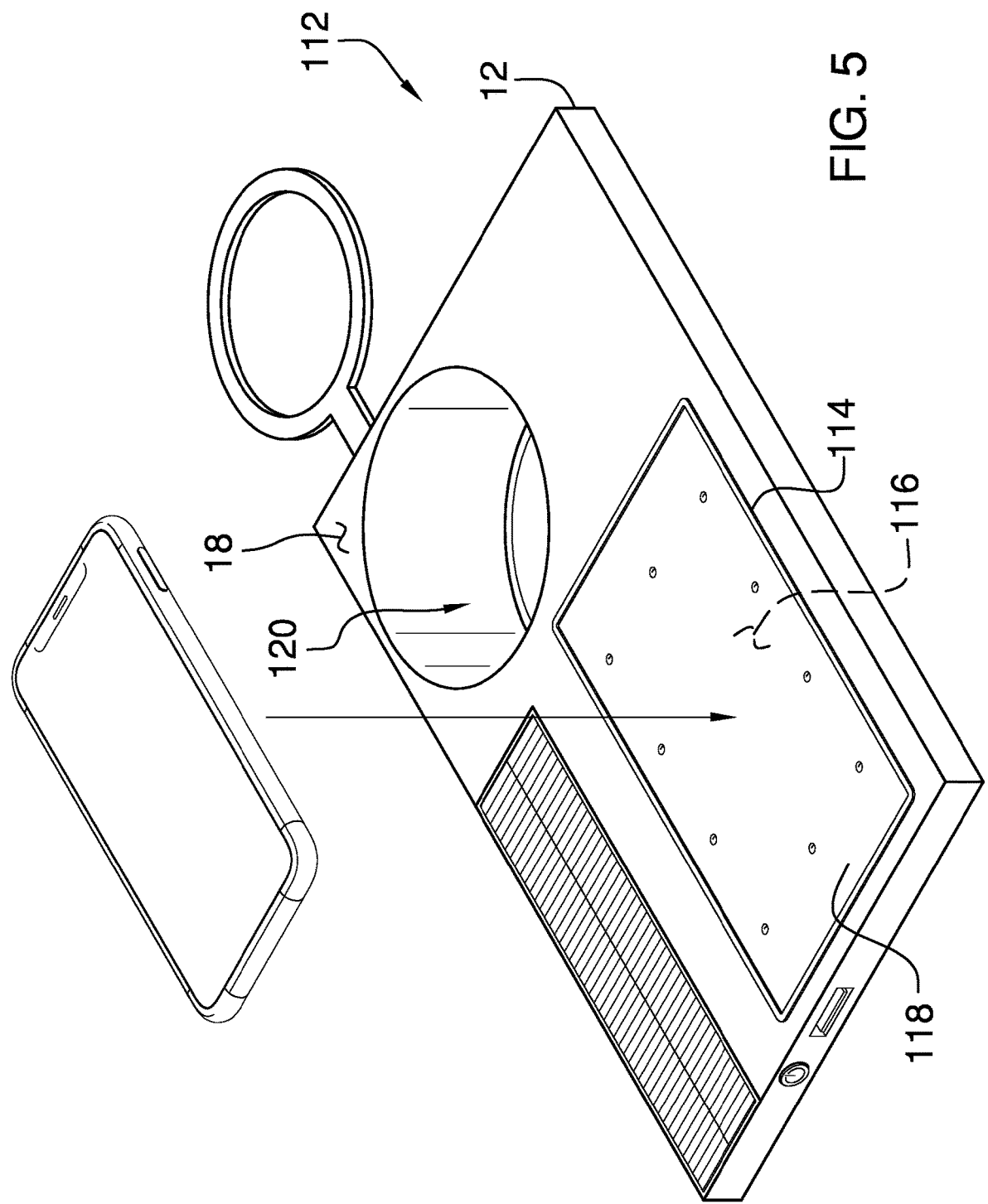
FIG. 5 is a top perspective view of an alternative embodiment of the disclosure.
Figure 6:
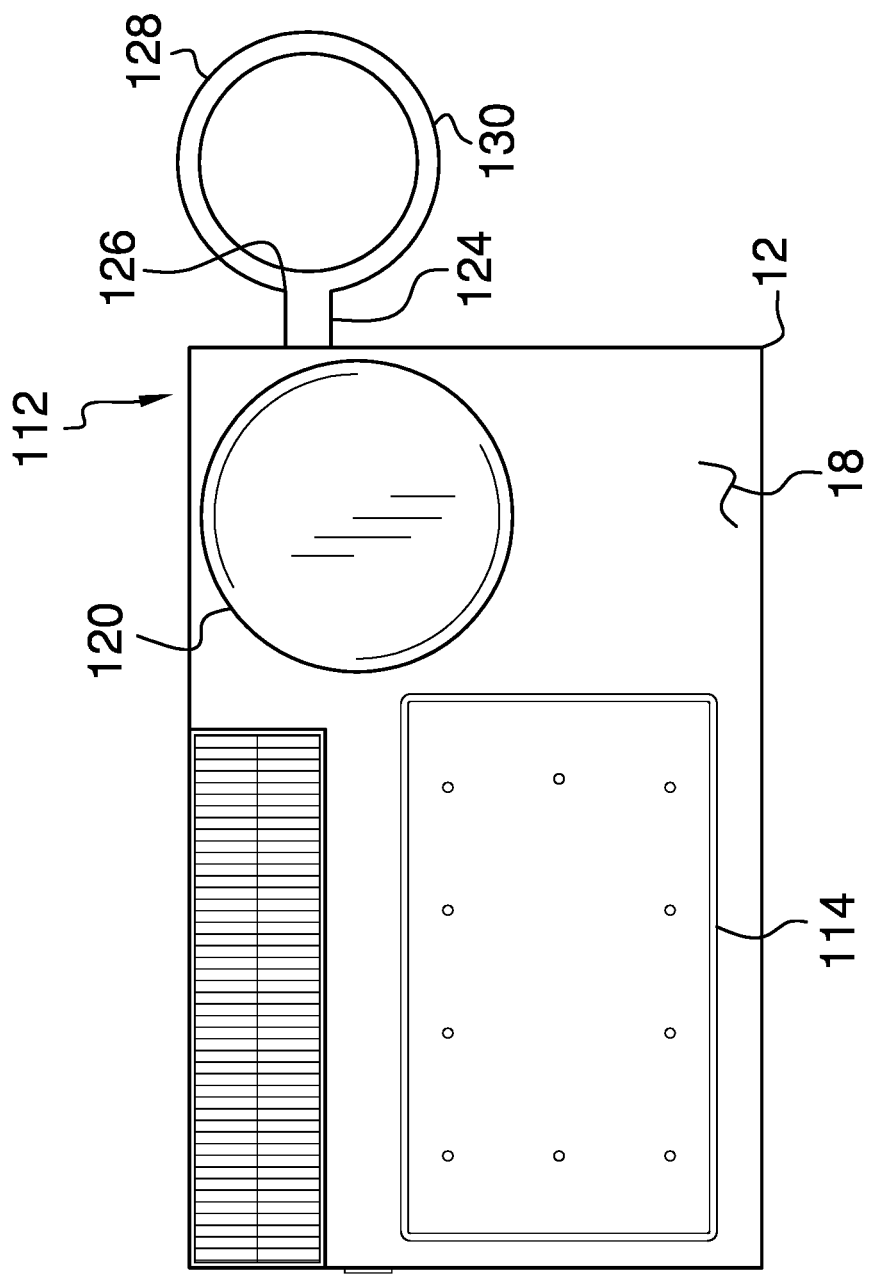
FIG. 6 is a top view of an alternative embodiment of the disclosure.
Figure 7:
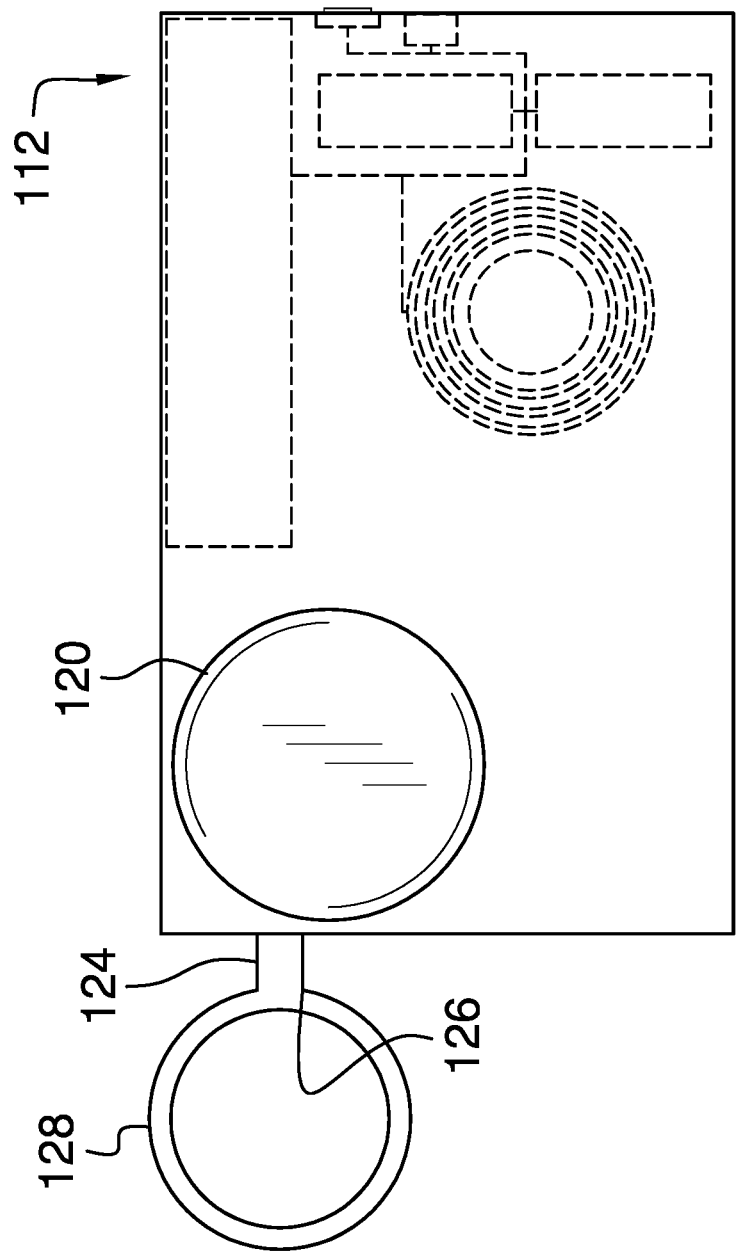
FIG. 7 is a bottom phantom view of an alternative embodiment of the disclosure.
Figure 8:
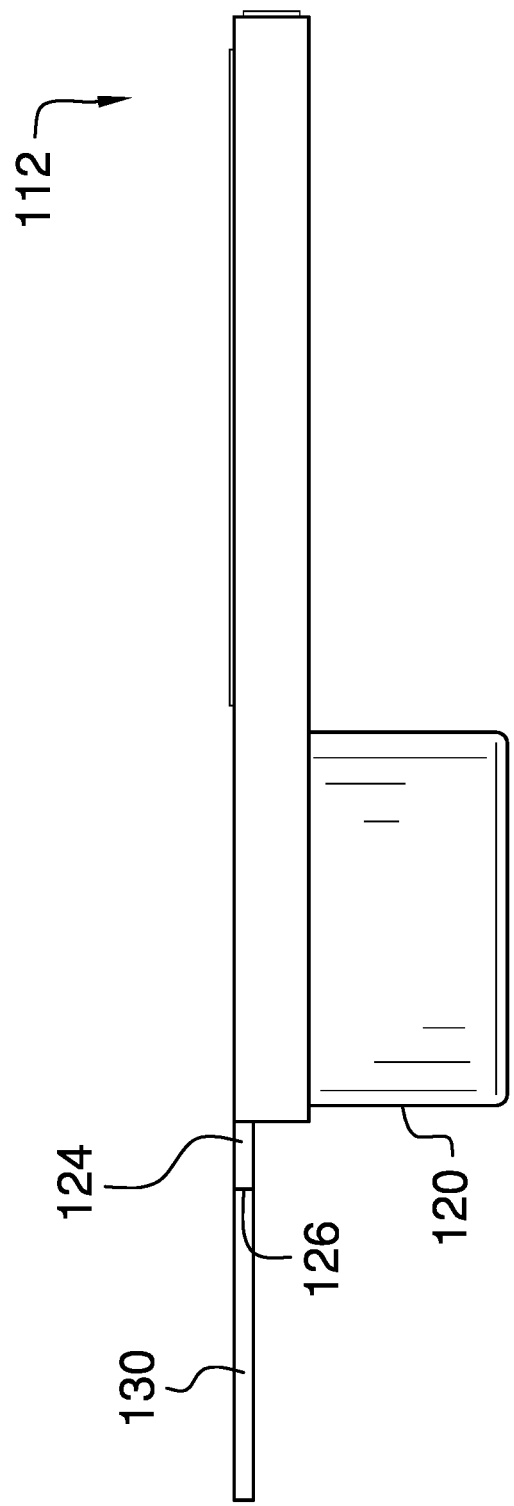
FIG. 8 is a right side view of an alternative embodiment of the disclosure.
Figure 9:
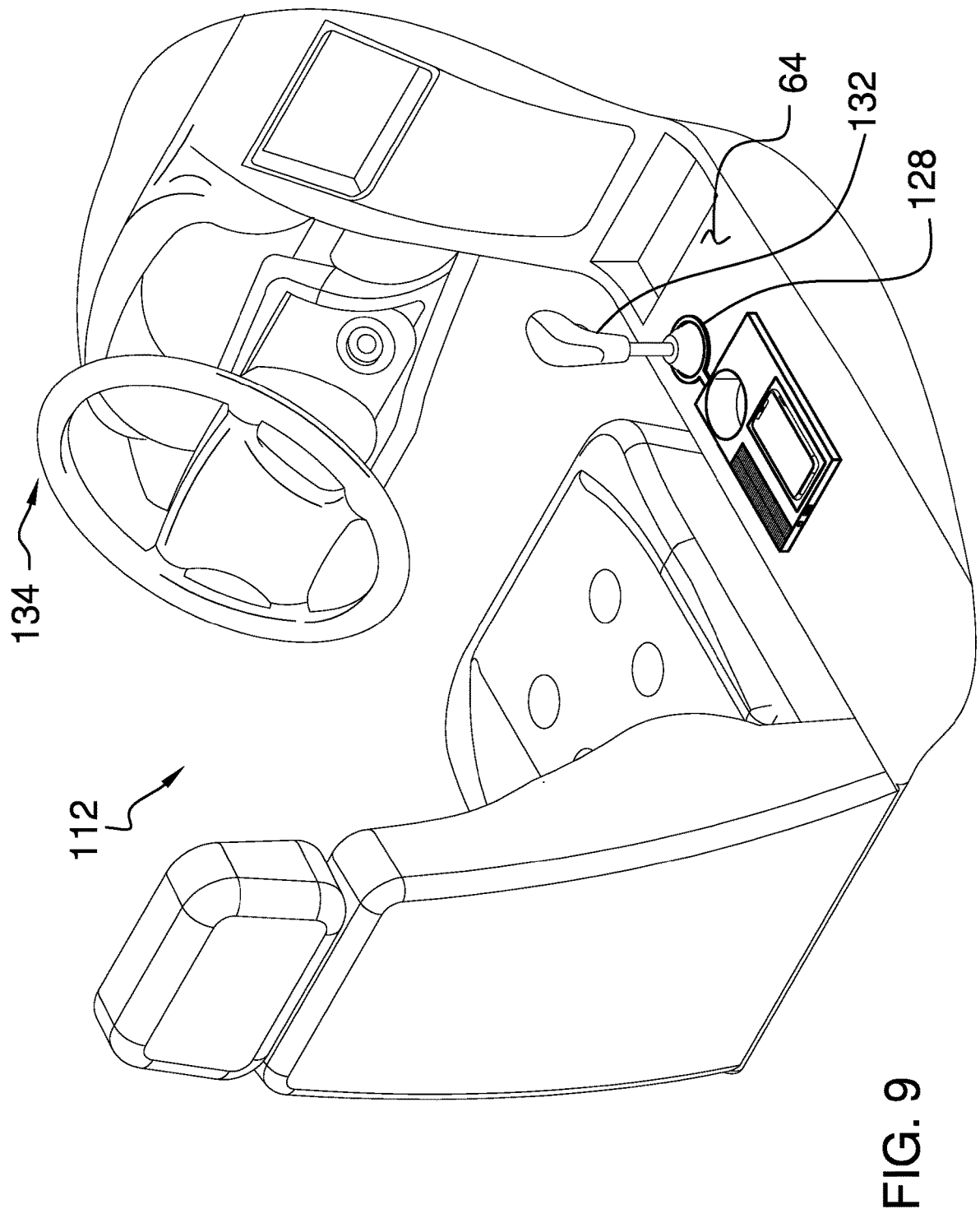
FIG. 9 is a perspective in-use view of an alternative embodiment of the disclosure.

With reference now to the drawings, and in particular to FIGS. 1 through 9 thereof, a new charging device embodying the principles and concepts of an embodiment of the disclosure and generally designated by the reference numeral 10 will be described.

As best illustrated in FIGS. 1 through 9, the portable phone charging assembly 10 generally comprises a panel 12 that has a planar surface 14 for supporting a personal electronic device 16. The personal electronic device 16 may comprise a smart phone or other type of electronic device that has wireless recharging capabilities. The panel 12 has a top surface 18, a bottom surface 20 and a perimeter surface 22 extending between the top surface 18 and the bottom surface 20, and the perimeter surface 22 has a front side 24, a back side 26, a first lateral side 28 and a second lateral side 30. The perimeter surface 22 has a well 32 extending inwardly on the second lateral side 30, and the top surface 18 defines the planar surface 14 for supporting the personal electronic device 16.

A pair of fixed grips 34 is each coupled to the panel 12 such that the fixed grips 34 restrain the personal electronic device 16 when the personal electronic device 16 is positioned on the planar surface 14 of the panel 12. Each of the fixed grips 34 comprises a first leg 36 extending upwardly from the top surface 18 and a first foot 38 that is spaced from the top surface 18 such that the personal electronic device 16 is positioned between the first foot 38 and the top surface 18. The first leg 36 associated with each of the fixed grips is aligned with a respective one of the back side 26 and the first lateral side 28 of the perimeter surface 22 such that the first foot 38 associated with each fixed grip 34 is directed toward the center of the panel 12.

A movable grip 40 is movably integrated into the panel 12 to facilitate the movable grip 40 to engage and subsequently restrain the personal electronic device 16 on the panel 12. The movable grip 40 comprises a slide 42 that is slidably positioned in the well in the second lateral side 30 of the perimeter surface 22 of the panel 12, and the slide 42 has an exposed end 44 with respect to the second lateral side 30. The movable grip 40 includes a second leg 46 that is coupled to the exposed end 44 of the slide 42 such that the second leg 46 extends upwardly along the second lateral side 30 of the perimeter surface 22 of the panel 12. The second leg 46 is movable an adjustable distance toward or away from the second lateral side 30 thereby facilitating the second leg 46 to abut the personal electronic device 16. The movable grip 40 includes a second foot 48 that is coupled to the second leg 46 such that the second foot 48 is spaced from the top surface 18 of the panel 12. In this way the personal electronic device 16 can be positioned between the second foot 48 of the movable grip 40 and the top surface 18. The second foot 48 associated the movable grip 40 is directed toward a center of the panel 12.

A member 50 is coupled to and extends away from the panel 12 and the member 50 comprises a first portion 52 that is hingedly coupled to a second portion 54. The member 50 has a first end 56 and a second end 58; the first end 56 is associated with the first portion 52 and the second end 58 is associated with the second portion 54. The first end 56 is coupled to the back side 26 of the perimeter surface 22 of the panel 12 and the member 50 is centrally positioned between the first lateral side 28 and the second lateral side 30 of the perimeter surface 22. A coupler 60 is attached to the second portion 54 of the member 50 and the coupler 60 has an adhesive element 62 thereby facilitating the adhesive element 62 to releasably engage a support surface 64 to inhibit the panel 12 from sliding. Furthermore, the coupler 60 is positionable at a variety of angles with respect to the panel 12 thereby facilitating the adhesive element 62 to releasably engage a variety of support surfaces.

The coupler 60 has a perimeter edge 66 and a front surface 68, and the perimeter edge 66 is rounded at each of a first end 56 and a second end 58 of the coupler 60 such that the coupler 60 has an ovoid shape. The perimeter edge 66 is coupled to the second end 58 of the member 50 at a point that is centrally positioned between the first end 56 and the second end 58 of the coupler 60. The adhesive element 62 is positioned on the front surface 68 of the coupler 60 and the adhesive element 62 has an exposed surface 70 with respect to the front surface 68. Additionally, the exposed surface 70 is comprised of an adhesive material thereby facilitating the exposed surface 70 to adhere to the support surface 64.

A charging unit 72 is attached to the panel 12 and the charging unit 72 is oriented to extend laterally away from the panel 12. The charging unit 72 is in wireless communication with the personal electronic device 16 when the personal electronic device 16 is positioned on the panel 12 for wirelessly charging the personal electronic device 16. The charging unit 72 includes a plurality of solar cells 74 such that each of the solar cells 74 converts solar energy into electrical energy. The charging unit 72 comprises a housing 76 that has an outer wall 78 and a top wall 80, and the outer wall 78 has a front side 82, a back side 88, a first sidelong side 90 and a second sidelong side 92. Additionally, each of the solar cells 74 is positioned on the top wall 80 and the solar cells 74 are distributed over an entirety of the top wall 80.

The front side 82 of the outer wall 78 has a first section 94 extending from the first sidelong side 90 toward the second sidelong side 92 and the front side 82 of the outer wall 78 has a second section 96 that is perpendicularly oriented with the first section 94. Additionally, the front side 92 of the outer wall 78 has a third section 98 extending between the second section 96 and the second sidelong side 92 such that the first section 94 is positioned closer to the back side 26 than the second section 96. The front side 24 of the perimeter surface 22 of the panel 12 is attached to the first section 94 such that the top surface 18 of the panel 12 is aligned with the top wall 80 of the housing 76. The second section 96 is attached to the first lateral side 28 of the perimeter surface 22 of the housing 76 such that the third section 98 extends laterally away from the first lateral side 28.

The charging unit 72 includes a control circuit 100 that is positioned in the housing 76 and each of the solar cells 74 is electrically coupled to the control circuit 100. The charging unit 72 includes a plurality of rechargeable batteries 102 and each of the rechargeable batteries 102 is positioned within the housing 76. Each of the rechargeable batteries 102 is electrically coupled to the control circuit 100 such that the plurality of solar cells 74 charges the rechargeable batteries 102. The charging unit 72 includes a transmitter 104 that is positioned within the panel 12 and the transmitter 104 is electrically coupled to the rechargeable batteries 102. Additionally, the transmitter 104 broadcasts a charging signal toward the top surface 18 of the panel 12 thereby facilitating the personal electronic device 16 to receive the charging signal when the personal electronic device 16 is placed on the top surface 18 of the panel 12.

The charging unit 72 includes a charge port 106 that is recessed into the third section 98 of the front side 24 of the outer wall 78 of the housing 76 to insertably receive a charge cord 108. Furthermore, the charge port 106 is electrically coupled to the rechargeable batteries 102 for charging the rechargeable batteries 102. A charge cord 108 for the personal electronic device 16 can be plugged into the charge port 106 to facilitate the personal electronic device 16 to be charged with the charge port 106 instead of wirelessly charging the personal electronic device 16. A power button 110 is movably integrated into the third section 98 of the front side 24 of the outer wall 78 of the housing 76, and the power button 110 is electrically coupled to the transmitter 104 for turning the transmitter 104 on and off.

In an alternative embodiment 112 as is most clearly shown in FIGS. 5 through 9, the top surface 18 of the panel 12 has a recess 114 extending toward the bottom surface 20 of the panel 12 thereby facilitating the recess 114 to insertably receive the personal electronic device 16. The recess 114 has a lower bounding surface 116 and a pad 118 is bonded to the lower bounding surface 116 such that the personal electronic device 16 rests on the pad 118 when the personal electronic device 16 is positioned in the recess 114. The pad 118 is comprised of a friction enhancing material thereby inhibiting the personal electronic device 16 from sliding.

Continuing in the alternative embodiment 112, the panel 12 includes a cup holder 120 which extends downwardly from the bottom surface 20 of the panel 12 to hold a beverage container. A stem 124 is coupled to and extends away from the front side 24 of the perimeter surface 22 of the panel 12 and the stem 124 has a distal end 126 with respect to the front side 24. A ring 128 is provided which has an outer edge 130, the outer edge 130 is coupled to the distal end 126 of the stem 124 and the ring 128 is positionable around a gear selector 132 in a vehicle 134 thereby restraining the panel 12 in the vehicle 134. Additionally, as is shown in the alternative embodiment, the charging unit 72 is an integral component of the panel 12.

In use, the personal electronic device 16 is positioned on the panel 12 such that the fixed grip 34 restrains the personal electronic device 16 and each of the movable grips 40 is manipulated to compress against the personal electronic device 16. In this way the personal electronic device 16 can be wirelessly charged while the personal electronic device 16 is placed on the panel 12. The coupler 60 can be coupled to a support surface 64 in the vehicle 134, for example, to secure the panel 12 in the vehicle 134. Additionally, the hinged nature of the member 50 facilitates the coupler 60 to be coupled to a variety of different support surfaces. The panel 12 can be strategically positioned to facilitate the solar cells 74 to be exposed to sunlight while the panel 12 is positioned in the vehicle to charge the rechargeable batteries 102. Additionally, the panel 12 can be carried such that the personal electronic device 16 can be charged in a portable manner.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable phone charging assembly for facilitating a personal electronic device to be charged with solar energy, said assembly comprising:

a panel having a planar surface for supporting a personal electronic device;

a pair of fixed grips, each of said fixed grips being coupled to said panel such that each of said fixed grip restrains the personal electronic device when the personal electronic device is positioned on said planar surface of said panel;

a movable grip being movably integrated into said panel to facilitate said movable grip to engage and subsequently restrain the personal electronic device on said panel;

a member being coupled to and extending away from said panel, said member comprising a first portion being hingedly coupled to a second portion;

a coupler being attached to said second portion of said member, said coupler having an adhesive element thereby facilitating said adhesive element to releasably engage a support surface to inhibit said panel from sliding, said coupler being positionable at a variety of angles with respect to said panel thereby facilitating said adhesive element to releasably engage a variety of support surfaces; and a charging unit being attached to said panel, said charging unit being oriented to extend laterally away from said panel, said charging unit being in wireless communication with the personal electronic device when the personal electronic device is positioned on said panel for wirelessly charging the personal electronic device, said charging unit including a plurality of solar cells such that each of said solar cells converts solar energy into electrical energy.

2. The assembly according to claim 1, wherein:

said panel has a top surface, a bottom surface and a perimeter surface extending between said top surface and said bottom surface, said perimeter surface having a front side, a back side, a first lateral side and a second lateral side, said perimeter surface having a well extending inwardly on said second lateral side, said top surface defining said planar surface for supporting the personal electronic device;

each of said fixed grips comprises a first leg extending upwardly from said top surface and a first foot being spaced from said top surface such that the personal electronic device is positioned between said first foot and said top surface, said first leg associated with each of said fixed grips being aligned with a receptive one of said first lateral side and said back side of said perimeter surface such that said first foot associated with each of said fixed grips is directed toward a center of said panel; and said movable grip comprises:

a slide being slidably positioned in said well said second lateral side of said perimeter surface of said panel, said slide having an exposed end with respect to said respective first lateral side and said second lateral side;

a second leg being coupled to said exposed end of said slide such that said second leg extends upwardly along said respective first lateral side and second lateral side of said perimeter surface of said panel, said second leg being movable an adjustable distance toward or away from said second lateral side thereby facilitating said second leg to abut the personal electronic device; and a second foot being coupled to said second leg such that said second foot is spaced from said top surface of said panel thereby facilitating the personal electronic device to be positioned between said second foot and said top surface, said second foot being directed toward a center of said panel.

3. The assembly according to claim 2, wherein:
said member has a first end and a second end, said first end being associated with said first portion, said second end being associated with said second portion, said first end being coupled to said back side of said perimeter surface of said panel, said member being centrally positioned between said first lateral side and said second lateral side of said perimeter surface; and
said coupler has a perimeter edge and a front surface, said perimeter edge being rounded at each of a first end and a second end of said coupler such that said couple has an ovoid shape, said perimeter edge being coupled to said second end of said member at a point being centrally positioned between said first end and said second end of said coupler, said adhesive element being positioned on said front surface of said coupler, said adhesive element having an exposed surface with respect to said front surface, said exposed surface being comprised of an adhesive material thereby facilitating said exposed surface to adhere to the support surface.

4. The assembly according to claim 2, wherein:
said charging unit comprises a housing having an outer wall and a top wall, said outer wall having a front side, a back side, a first sidelong side and a second sidelong side, said front side of said outer wall having a first section extending from said first sidelong side toward said second sidelong side, said front side of said outer wall having a second section being perpendicularly oriented with said first section, said front side of said outer wall having a third section extending between said second section and said second sidelong side such that said first section is positioned closer to said back side than said second section; and
said front side of said perimeter surface of said panel is attached to said first section such that said top surface of said panel is aligned with said top wall of said housing, said second section being attached to said first lateral side of said perimeter surface of said housing such that said third section extends laterally away from said first lateral side, each of said solar cells being positioned on said top wall, said solar cells being distributed over an entirety of said top wall.

5. The assembly according to claim 4, wherein said charging unit includes:
a control circuit being positioned in said housing, each of said solar cells being electrically coupled to said control circuit;
a plurality of rechargeable batteries, each of said rechargeable batteries being positioned within said housing, each of said rechargeable batteries being electrically coupled to said control circuit such that said plurality of solar cells charge said rechargeable batteries; and
a transmitter being positioned within said panel, said transmitter being electrically coupled to said rechargeable batteries, said transmitter broadcasting a charging signal toward said top surface of said panel thereby facilitating the personal electronic device to receive said charging signal when said personal electronic device is placed on said top surface of said panel.

6. The assembly according to claim 5, wherein said charging unit includes:
a charge port being recessed into said third section of said front side of said outer wall of said housing wherein said charge port is configured to insertably receive a charge cord, said charge port being electrically coupled to said rechargeable batteries for charging said rechargeable batteries; and
a power button being movably integrated into said third section of said front side of said outer wall of said housing, said power button being electrically coupled to said transmitter for turning said transmitter on and off.

7. A portable phone charging assembly for facilitating a personal electronic device to be charged with solar energy, said assembly comprising:
a panel having a planar surface for supporting a personal electronic device, said panel having a top surface, a bottom surface and a perimeter surface extending between said top surface and said bottom surface, said perimeter surface having a front side, a back side, a first lateral side and a second lateral side, said perimeter surface having a well extending inwardly on said second lateral side, said top surface defining said planar surface for supporting the personal electronic device;
a pair of fixed grips, each of said fixed grips being coupled to said panel such that each of said fixed grip restrains the personal electronic device when the personal electronic device is positioned on said planar surface of said panel, each of said fixed grips comprises a first leg extending upwardly from said top surface and a first foot being spaced from said top surface such that the personal electronic device is positioned between said first foot and said top surface, said first leg associated with each of said fixed grips being aligned with a receptive one of said first lateral side and said back side of said perimeter surface such that said first foot associated with each of said fixed grips is directed toward a center of said panel;
a movable grip being movably integrated into said panel to facilitate said movable grip to engage and subsequently restrain the personal electronic device on said panel, said movable grip comprising:
a slide being slidably positioned in said well said second lateral side of said perimeter surface of said panel, said slide having an exposed end with respect to said respective first lateral side and said second lateral side;
a second leg being coupled to said exposed end of said slide such that said second leg extends upwardly along said respective first lateral side and second lateral side of said perimeter surface of said panel, said second leg being movable an adjustable distance toward or away from said second lateral side thereby facilitating said second leg to abut the personal electronic device; and
a second foot being coupled to said second leg such that said second foot is spaced from said top surface of said panel thereby facilitating the personal electronic device to be positioned between said second foot and said top surface, said second foot being directed toward a center of said panel;
a member being coupled to and extending away from said panel, said member comprising a first portion being hingedly coupled to a second portion, said member having a first end and a second end, said first end being associated with said first portion, said second end being associated with said second portion, said first end being coupled to said back side of said perimeter surface of said panel, said member being centrally positioned between said first lateral side and said second lateral side of said perimeter surface;

a coupler being attached to said second portion of said member, said coupler having an adhesive element thereby facilitating said adhesive element to releasably engage a support surface to inhibit said panel from sliding, said coupler being positionable at a variety of angles with respect to said panel thereby facilitating said adhesive element to releasably engage a variety of support surfaces, said coupler having a perimeter edge and a front surface, said perimeter edge being rounded at each of a first end and a second end of said coupler such that said couple has an ovoid shape, said perimeter edge being coupled to said second end of said member at a point being centrally positioned between said first end and said second end of said coupler, said adhesive element being positioned on said front surface of said coupler, said adhesive element having an exposed surface with respect to said front surface, said exposed surface being comprised of an adhesive material thereby facilitating said exposed surface to adhere to the support surface; and a charging unit being attached to said panel, said charging unit being oriented to extend laterally away from said panel, said charging unit being in wireless communication with the personal electronic device when the personal electronic device is positioned on said panel for wirelessly charging the personal electronic device, said charging unit including a plurality of solar cells such that each of said solar cells converts solar energy into electrical energy, said charging unit comprising:

a housing having an outer wall and a top wall, said outer wall having a front side, a back side, a first sidelong side and a second sidelong side, said front side of said outer wall having a first section extending from said first sidelong side toward said second sidelong side, said front side of said outer wall having a second section being perpendicularly oriented with said first section, said front side of said outer wall having a third section extending between said second section and said second sidelong side such that said first section is positioned closer to said back side than said second section, said front side of said perimeter surface of said panel being attached to said first section such that said top surface of said panel is aligned with said top wall of said housing, said second section being attached to said first lateral side of said perimeter surface of said housing such that said third section extends laterally away from said first lateral side, each of said solar cells being positioned on said top wall, said solar cells being distributed over an entirety of said top wall;

a control circuit being positioned in said housing, each of said solar cells being electrically coupled to said control circuit;

a plurality of rechargeable batteries, each of said rechargeable batteries being positioned within said housing, each of said rechargeable batteries being electrically coupled to said control circuit such that said plurality of solar cells charge said rechargeable batteries;

a transmitter being positioned within said panel, said transmitter being electrically coupled to said rechargeable batteries, said transmitter broadcasting a charging signal toward said top surface of said panel thereby facilitating the personal electronic device to receive said charging signal when said personal electronic device is placed on said top surface of said panel;

a charge port being recessed into said third section of said front side of said outer wall of said housing wherein said charge port is configured to insertably receive a charge cord, said charge port being electrically coupled to said rechargeable batteries for charging said rechargeable batteries; and a power button being movably integrated into said third section of said front side of said outer wall of said housing, said power button being electrically coupled to said transmitter for turning said transmitter on and off.

8. The assembly according to claim 7, wherein:

said top surface of said panel has a recess extending toward said bottom surface of said panel thereby facilitating said recess to insertably receive the personal electronic device, said recess having a lower bounding surface; and said assembly includes a pad being bonded to said lower bounding surface such that the personal electronic device rests on said pad when the personal electronic device is positioned in said recess, said pad being comprised of a friction enhancing material thereby inhibiting the personal electronic device from sliding.

9. The assembly according to claim 7, wherein said panel has cup holder extending downwardly from said bottom surface of said panel wherein said cup holder is configured to hold a beverage container.

10. The assembly according to claim 7, further comprising:

a stem being coupled to and extending away from said front side of said perimeter surface of said panel, said stem having a distal end with respect to said front side; and a ring having an outer edge, said outer edge being coupled to said distal end of said stem, said ring being positionable around a gear selector in a vehicle thereby restraining said panel in the vehicle.

* * * * *